United States Patent
Snyder

(10) Patent No.: US 7,463,968 B2
(45) Date of Patent: Dec. 9, 2008

(54) METHOD AND APPARATUS TO CONTROL ENGINE STOP FOR A HYBRID POWERTRAIN SYSTEM

(75) Inventor: Bryan R. Snyder, Waterford, MI (US)

(73) Assignee: GL Global Technology Operations, Inc., Detroit, MI (US)

( * ) Notice: Subject to any disclaimer, the term of this patent is extended or adjusted under 35 U.S.C. 154(b) by 42 days.

(21) Appl. No.: 11/743,969

(22) Filed: May 3, 2007

(65) Prior Publication Data

US 2008/0275625 A1   Nov. 6, 2008

(51) Int. Cl.
- G06F 17/00 (2006.01)
- B60W 10/02 (2006.01)
- F02N 17/00 (2006.01)
- F02M 51/00 (2006.01)
- G05D 1/00 (2006.01)

(52) U.S. Cl. .............. 701/112; 123/179.4; 123/198 DB; 477/6; 701/104

(58) Field of Classification Search ................. 701/102, 701/103, 104, 108, 110, 115; 477/74, 173, 477/3, 6; 180/65.1, 65.2, 65.3, 65.4; 123/198 D, 123/198 DB, 198 F, 179.1, 179.4, 179.16
See application file for complete search history.

(56) References Cited

U.S. PATENT DOCUMENTS

| | | | | |
|---|---|---|---|---|
| 4,212,065 A * | 7/1980 | Marchak et al. | ............. | 701/104 |
| 6,070,680 A * | 6/2000 | Oyama | ...................... | 180/65.2 |
| 7,146,966 B2 * | 12/2006 | Nakamura | ................... | 123/481 |
| 7,150,254 B2 * | 12/2006 | Ichimoto et al. | ......... | 123/179.4 |
| 7,249,589 B1 * | 7/2007 | Tomatsuri et al. | ........... | 123/357 |
| 7,263,959 B2 * | 9/2007 | Kataoka et al. | .......... | 123/179.4 |
| 2007/0232444 A1 * | 10/2007 | Adachi | ........................ | 477/74 |

* cited by examiner

*Primary Examiner*—Willis R. Wolfe, Jr.
*Assistant Examiner*—Johnny H. Hoang

(57) ABSTRACT

A control scheme is provided for stopping an internal combustion engine of a hybrid powertrain during ongoing vehicle operation. The method, executed as program code in an article of manufacture comprises the following steps in the sequence set forth. First, engine operation is controlled to stop firing the engine. A damper clutch is controlled to lock rotation of the engine and the electro-mechanical transmission. Torque outputs from the first and second electrical machines are then selectively controlled to reduce engine speed. Torque outputs from the first and second electrical machines are then selectively controlled to stop rotation of the engine substantially near a predetermined crank position.

19 Claims, 3 Drawing Sheets

METHOD AND APPARATUS TO CONTROL ENGINE STOP FOR A HYBRID POWERTRAIN SYSTEM

TECHNICAL FIELD

This invention pertains generally to control systems for powertrain control systems employing electro-mechanical transmissions.

BACKGROUND OF THE INVENTION

Hybrid powertrain architectures comprise torque-generative devices, including internal combustion engines and electric machines, which transmit torque through a transmission device to a vehicle driveline. A hybrid powertrain architecture reduces fuel consumption through the engine by shutting off the engine at opportune moments during ongoing vehicle operation, including events such as the vehicle stopped at a light or in traffic, or when the vehicle is operating on a downhill portion of a highway. A powertrain architecture includes, e.g., an engine and transmission system controlled and mechanized to shut off the engine, and restart it using a belt drive through an alternator, often referred to as a belt-alternator-starter (BAS) device. Other powertrain architectures include engine and transmission systems wherein one or more electrical motors generate motive torque which is transmitted to the vehicle driveline directly or through the transmission.

One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation, including fixed gear modes and continuously variable modes. Engineers implementing powertrain systems having electro-mechanical transmissions are tasked with implementing control schemes to monitor system states and control operation of various systems and actuators to effectively control powertrain operation.

Operation of the powertrain system includes selectively starting and stopping operation of the internal combustion engine. Engine stopping can be operator-initiated, wherein the vehicle operator stops the engine operation by way of a key-off crank action. Engine stopping further comprises automatic engine stop events during ongoing vehicle operation, wherein the engine is automatically stopped by the control system. This typically occurs in response to a control system determination of an opportunity to stop the engine and referred to as a quiescent auto-stop event. The control system selectively stops operation of the internal combustion engine to optimize energy efficiency, and for other reasons.

During an engine stop event, compression torque pulses are generated in unfired engine cylinders and transmitted to a transmission torque damper and the engine block, which may result in objectionable vibrations reaching the vehicle operator, especially at resonant frequencies for the powertrain and various driveline components.

There is a need for a control scheme which effectively stops operation of an internal combustion engine and accommodates pressure pulses and vibrations including during ongoing vehicle operation. Such a system is described hereinafter.

SUMMARY OF THE INVENTION

In accordance with an embodiment of the invention, a control scheme is provided for stopping an internal combustion engine of a hybrid powertrain, including during ongoing vehicle operation. The method, preferably executed as program code in an article of manufacture comprises the following steps in the sequence set forth. First, engine operation is controlled to stop firing the engine. A damper clutch is controlled to lock rotation of the engine and the electro-mechanical transmission. Torque outputs from electrical machines are then selectively controlled to reduce engine speed. Torque outputs from the electrical machines are then selectively controlled to stop rotation of the engine substantially near a predetermined crank position.

An aspect of the invention includes the powertrain comprising the internal combustion engine and first and second electrical machines and an electro-mechanical transmission selectively operative to transmit torque therebetween.

An aspect of the invention includes an engine torque simulation model to accurately determine engine compression pressures in real-time to accommodate changes in engine operating conditions, based upon present engine operating conditions.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
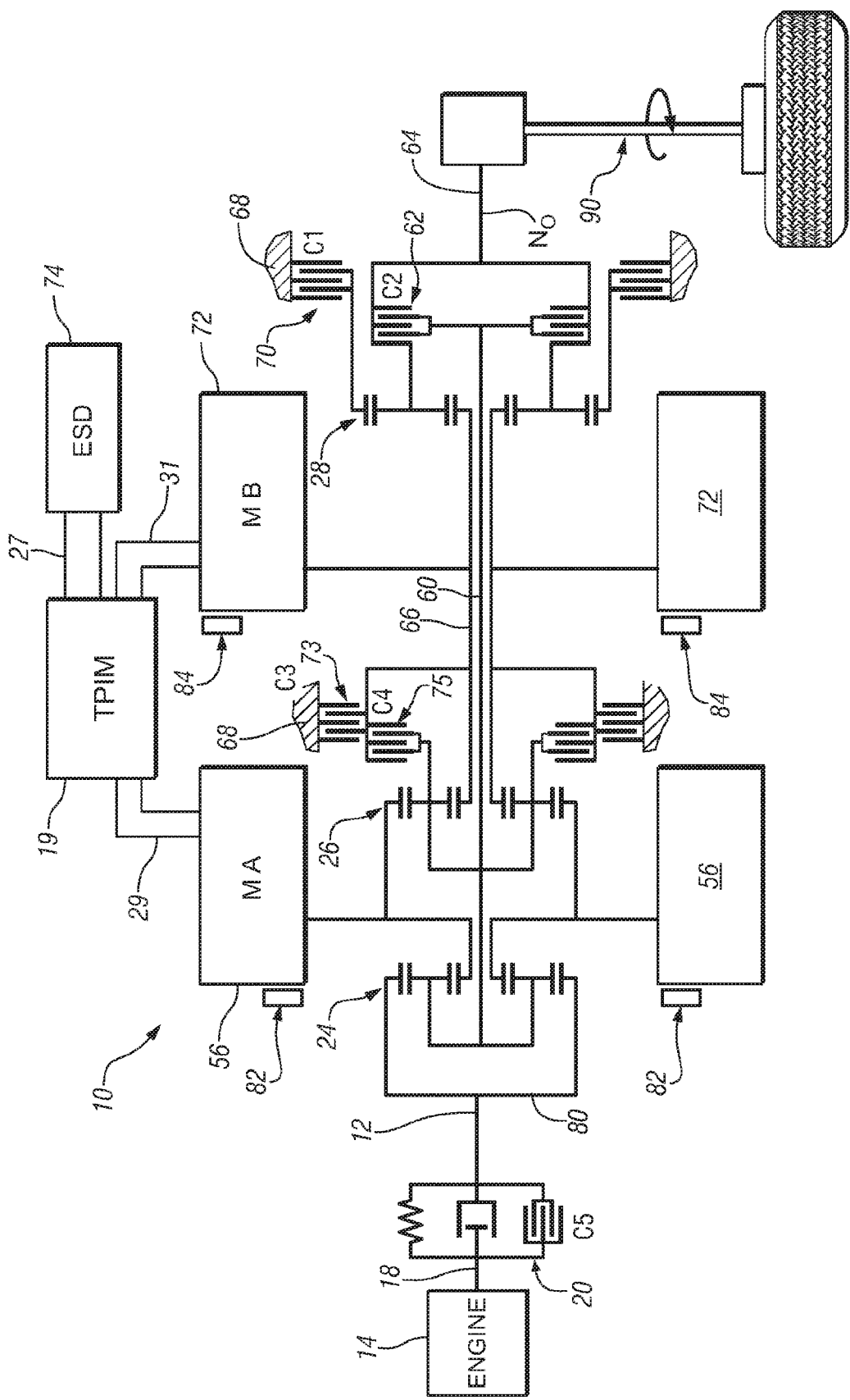
FIG. 1 is a schematic diagram of an exemplary powertrain, in accordance with the present invention.

The drawings are now described, wherein the depictions are for the purpose of illustrating the invention only and not for the purpose of limiting the same. Referring now FIGS. 1 and 2, a system illustrative of the invention is depicted, comprising an engine 14, transmission 10, control system, and driveline. Mechanical aspects of transmission 10 are disclosed in detail in commonly assigned U.S. Pat. No. 6,953, 409, entitled "Two-Mode, Compound-Split, Hybrid Electro-Mechanical Transmission having Four Fixed Ratios", which is incorporated herein by reference. The transmission 10 includes an input shaft 12 having an input speed, $N_I$ that is preferably driven by the internal combustion engine 14. The engine 14 has a crankshaft operatively connected via shaft 18 to a lockable torque damper device 20 operative to transmit torque to the transmission input shaft 12. The lockable torque damper device includes clutch C5, which locks the torque damper device 20, thus transmitting torque directly between the engine and the input shaft 12 of the transmission. The engine has characteristic speed $N_E$ and output torque $T_E$. When the damper device 20 is locked, the engine speed $N_E$ and output torque $T_E$ are effectively equal to the transmission input speed $N_I$ and input torque $T_I$, with any differences comprising twisting of the components therebetween.

The transmission 10 utilizes three planetary-gear sets 24, 26 and 28, and four torque-transmitting devices, i.e., clutches C1 70, C2 62, C3 73, and C4 75. Clutches C2 and C4 preferably comprise hydraulically-actuated rotating friction clutches. Clutches C1 and C3 preferably comprise comprising hydraulically-actuated stationary devices grounded to the transmission case 68.

There is a first electrical machine comprising a motor/generator 56, referred to as MA, and a second electrical machine comprising a motor/generator 72, referred to as MB operatively connected to the transmission via the planetary gears. Rotational positions of MA and MB are measured using resolvers 82 and 84, respectively, which are known electrical devices each comprising a stator and rotor which are operative to measure position of the electrical machines. Transmission output shaft 64 is operably connected to a vehicle driveline 90 to provide motive output torque, $T_O$ at output speed $N_O$ to vehicle wheels.

The transmission 10 receives input torque from the torque-generative devices, including the engine 14 and the MA 56 and MB 72, and referred to as '$T_I$', '$T_A$', and '$T_B$' respectively, as a result of energy conversion from fuel or electrical potential stored in an electrical energy storage device (ESD) 74. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MA 56 by transfer conductors 29, and the TPIM 19 similarly transmits electrical energy to and from MB 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MA 56 and MB 72 are three-phase AC machines each having a rotor operable to rotate within a stator that is mounted on a case of the transmission. The inverters comprise known complementary three-phase power electronics devices.

Figure 2:
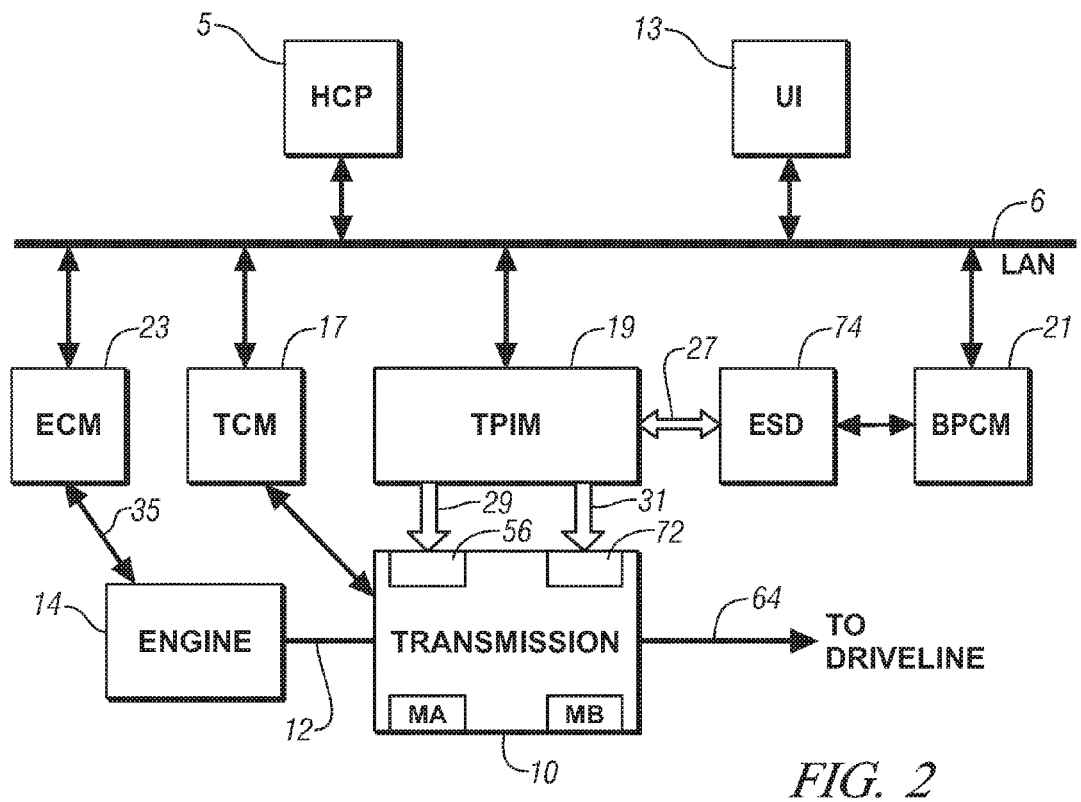
FIG. 2 is a schematic diagram of an exemplary architecture for a control system and powertrain, in accordance with the present invention; and, FIGS. 3 and 4 are graphical depictions, in accordance with the present invention.

Referring now to FIG. 2, a schematic block diagram of the control system, comprising distributed control module architecture, is shown. The elements described hereinafter comprise a subset of overall vehicle control architecture, and are operable to provide coordinated system control of the powertrain system described herein. The control system synthesizes pertinent information and inputs, and executes algorithms to control various actuators to achieve control targets, including such parameters as fuel economy, emissions, performance, driveability, and protection of hardware, including batteries of ESD 74 and MA and MB 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor torques $T_A$ and $T_B$ for MA and MB. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the N clutches, i.e., C1, C2, C3, and C4, and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power, referred to as a range $P_{BAT\_MIN}$ to $P_{BAT\_MAX}$.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds (msec) during ongoing engine and vehicle operation. Alternatively, algorithms may be executed in response to occurrence of an event.

The exemplary two-mode, compound-split, electro-mechanical transmission operates in several fixed gear operating modes and two continuously variable operating modes, described with reference to FIG. 1, and Table 1, below.

TABLE 1

| Transmission Operating Range State | Actuated Clutches | |
| --- | --- | --- |
| Mode 1 - Engine Off (M1_Eng_Off) | C1 | |
| Mode 1 - Engine On (M1_Eng_On) | C1 | |
| Fixed Ratio 1 (GR1) | C1 | C4 |
| Fixed Ratio 2 (GR2) | C1 | C2 |
| Mode 2 - Engine Off (M2_Eng_Off) | C2 | |
| Mode 2 - Engine On (M2_Eng_On) | C2 | |
| Fixed Ratio 3 (GR3) | C2 | C4 |
| Fixed Ratio 4 (GR4) | C2 | C3 |

The various transmission operating range states described in the table indicate which of the specific clutches C1, C2, C3, and C4 are engaged or actuated for each of the operating range states. A first mode, i.e., Mode 1, is selected when clutch C1 70 is actuated in order to "ground" the outer gear member of the third planetary gear set 28. The engine 14 can be either on or off. A second mode, i.e., Mode 2, is selected when clutch C1 70 is released and clutch C2 62 is simultaneously actuated to connect the shaft 60 to the carrier of the third planetary gear set 28. Again, the engine 14 can be either on or off. Other factors outside the scope of the invention affect when the electrical machines 56, 72 operate as motors and generators, and are not discussed herein.

The first and second continuously variable modes of operation refer to circumstances in which the transmission functions are controlled by one clutch, i.e., either clutch C1 62 or C2 70, and by the controlled speed and torque of the electrical machines 56 and 72. Certain ranges of operation comprise fixed gear ratios achieved by applying an additional clutch. This additional clutch may be clutch C3 73 or C4 75, as shown in the table, above. When the additional clutch is applied, fixed ratio operation of input-to-output speed of the transmission, i.e., $N_I/N_O$, is achieved. The rotations of machines MA and MB 56, 72 are dependent on internal rotation of the mechanism as defined by the clutching and proportional to the input speed measured at shaft 12.

In response to an operator's action, as captured by the UI 13, the supervisory HCP control module 5 and one or more of the other control modules determine the operator torque request $T_{O\_REQ}$, to be executed at shaft 64. Final vehicle acceleration is affected by other factors, including, e.g., road load, road grade, and vehicle mass. The operating mode is determined for the exemplary transmission based upon a variety of operating characteristics of the powertrain. This includes an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine which determines optimum system efficiency based upon operator demand for power, battery state of charge, and energy efficiencies of the engine 14 and MA and MB 56, 72. The control system manages torque inputs from the engine 14 and MA and MB 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

The exemplary engine 14 comprises a multi-cylinder internal combustion engine selectively operative in several states to transmit torque to the transmission via shaft 12, and can be either a spark-ignition or a compression-ignition engine. The exemplary engine states comprise normal engine operation ('ALL_CYL'), engine operation with deactivated cylinders ('DEACT'), engine fuel-cutoff ('FCO'), engine fuel-cutoff with cylinder deactivation ('FCO_DEACT'), and engine-off ('OFF'). In normal engine operation, all the engine cylinders are fueled and fired. In the cylinder deactivation state, typically half of the cylinders, e.g., one bank of a V-configured engine, are deactivated. A bank of cylinders is typically deactivated by discontinuing fuel delivery thereto and selectively leaving open exhaust valves to reduce engine pumping losses. In the engine fuel-cutoff state, fuel delivery to all the cylinders is discontinued. In the engine fuel-cutoff with cylinder deactivation state, fuel delivery to all the cylinders is discontinued and a bank of the cylinders is deactivated to reduce pumping losses. The engine-off state is defined by engine input speed, $N_E$, being equal to zero revolutions per minute (RPM), i.e., the engine crankshaft is not rotating.

Figure 3:
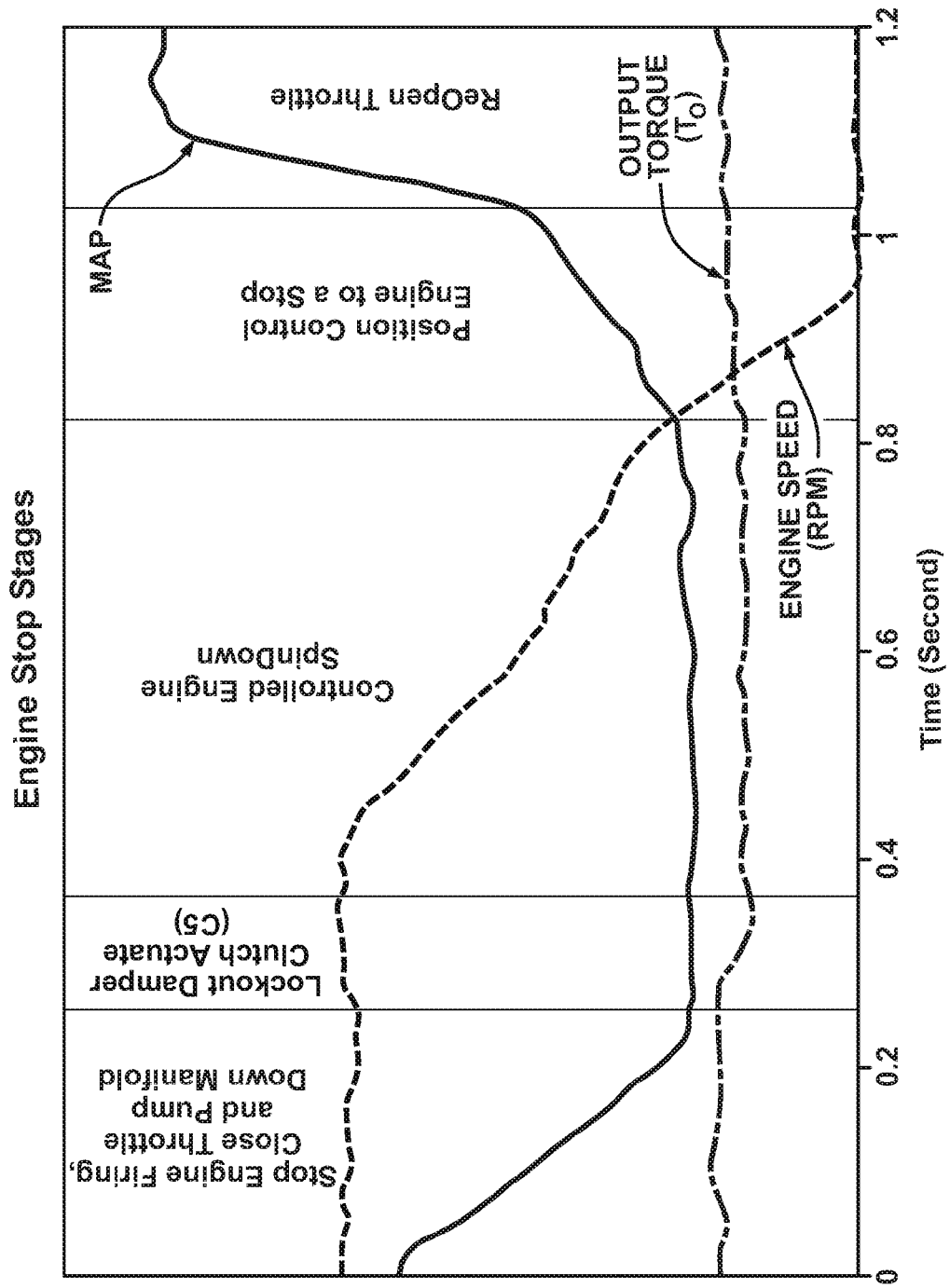

Referring now to FIG. 3, the control scheme to stop rotation of the internal combustion engine during ongoing vehicle operation is now described, with reference to the exemplary hybrid powertrain system of FIGS. 1 and 2. Prior to executing steps to stop the engine during ongoing operation, the electro-mechanical transmission is controlled to either one of the continuously variable modes of operation (i.e., Mode 1, Mode 2). The control scheme is executed in one or more of the control modules as machine-executable code operative to control elements of the hybrid powertrain to generate torque output from the electrical machines to stop rotation of the engine which is not firing. The program comprises sequentially executed steps, wherein each step is preferably substantially completed prior to executing a subsequent step. The first step comprises controlling engine operation to stop firing the engine, and can include minimizing intake manifold absolute pressure. Next, the damper lockout clutch device is actuated. Next, torque outputs from the first and second electrical machines are selectively controlled to reduce engine speed, i.e., control spindown of engine rotation. Next, torque outputs from the first and second electrical machines are controlled to stop the engine rotation substantially at or near a predetermined crank position. The previously closed engine throttle is preferably re-opened subsequent to stopping rotation of the engine. The damper clutch preferably locks rotation of the engine to the electro-mechanical transmission during the period when the engine is stopped.

The engine stop event is initiated by a command from the HCP 5, resulting from control schemes focused on optimizing system efficiency and including decisions based upon exceeding system-imposed limits. The system-imposed limits comprise operating parameters of vehicle speed, battery SOC, battery temperature, battery power capability, battery voltages, engine coolant temperature, system thermal limits, and system diagnostics. Each of these operating parameters is monitored by one or more of the control modules, and a decision to stop the engine can be based upon one of the parameters exceeding a predetermined threshold, or a combination of the parameters exceeding predetermined thresholds coincident to one another. A decision to stop the engine can occur during a vehicle coastdown event or during steady state operation. Each decision to restart the engine includes a debounce analysis of engine start/stop events, effectively adding a hysteresis to each starting event. The debounce analysis includes, for example, tying operator behavior to an engine stop that is being initiated based upon efficiency calculations. Thus engine stops are avoided that would be unexpected by the vehicle operator, e.g., not stopping the engine when the operator is depressing the accelerator pedal.

The first step comprises controlling engine operation to stop firing the engine. When the engine comprises a spark-ignition engine, stopping engine firing comprises stopping fuel delivery and spark energy. When the engine comprises a compression-ignition engine, stopping engine firing comprises stopping fuel delivery. Stopping firing the engine can include minimizing intake manifold absolute pressure (MAP). The engine minimizes MAP by closing throttle valve(s) of the engine to a minimum opening, typically zero percent open, with the engine still being fueled. Closing the throttle valve can be accomplished by controlling position of electronically-controlled intake air management valves to a zero throttle opening. Such action significantly reduces crankshaft torque oscillations during the engine stop. Engine idle speed is maintained by controlling system torque through the electrical machines MA, MB. When the spark-ignition engine is used, spark retard is ramped in to minimize engine torque generation during this period. When the compression-ignition engine is used, timing of engine fuel injection is adjusted to minimize the engine torque generation. Fuel injection is sequentially disabled according to the engine cylinder firing order, so that each combustion chamber is purged of any combustion charge prior to stopping the engine. When the engine mechanization includes variable cam phasing device, it is preferably controlled to a parked position during this period. The park position of the variable cam phasing device can be either one of a full-retard position and full-advance position, depending upon engine design and constraints.

Subsequently the damper clutch of device 20 operative to lock rotation of the engine and the electro-mechanical transmission is actuated through clutch C5. The clutch C5 is preferably actuated as a step-input, with no ramp-in time. Because the engine MAP is at low levels, oscillations are substantially reduced and effects on system dynamics are minimized.

Next, torque outputs from the first and second electrical machines are selectively controlled to reduce engine speed, i.e., control spindown of engine rotation. During this period, the engine is in fuel-cutoff mode, and the electrical machines control engine speed. A preferred engine speed deceleration rate comprises a maximum speed change that minimizes engine and system dynamics. A small amount of inertial energy is recovered, and total time to stop the engine is minimal, permitting fast turnaround for a subsequent restart event. This also serves to limit magnitude of fresh air (i.e., a lean exhaust gas feedstream) flushed through the exhaust aftertreatment system, to limit any effect upon tailpipe emissions, and limit long-term deterioration of catalytic devices. Selectively controlling torque outputs from the first and second electrical machines to reduce engine speed comprises executing computer code comprising a system equation to determine motor torque outputs from each of the first and second electrical machines.

When the exemplary transmission is operated in one of the continuously variable modes, the speed relationship between MA, MB, $N_I$ and $N_O$ is defined as shown in Eq. 1, below:

$$\begin{bmatrix} N_A \\ N_B \end{bmatrix} = \begin{bmatrix} b_{11} & b_{12} \\ B_{21} & b_{22} \end{bmatrix} \begin{bmatrix} N_I \\ N_O \end{bmatrix} \quad [1]$$

wherein $N_I$ comprises the input speed from engine 14, $N_O$ is the transmission output speed, $N_A$ and $N_B$ are the operating speeds for MA 56 and MB 72, and $b_{11}$, $b_{12}$, $b_{21}$, $b_{22}$, are known scalar values determined for the specific application in the specific operating range state. Therefore, the determined scalar values for $b_{11}$, $b_{12}$, $b_{21}$, $b_{22}$ are specific to each of Mode 1 and Mode 2. In this application, when the transmission output speed, $N_O$ and $N_I$ are known, motor speeds $N_A$ and $N_B$ can be determined.

System torque control and management in one of the continuously variable operating modes is preferably controlled using the torque relationship described in Eq. 2, below:

$$\begin{bmatrix} T_A \\ T_B \end{bmatrix} = \begin{bmatrix} k11 & k12 & k13 & k14 \\ k21 & k22 & k23 & k24 \end{bmatrix} * \begin{bmatrix} T_I \\ T_O \\ N_{I\_DOT} \\ N_{O\_DOT} \end{bmatrix} \quad [2]$$

wherein:

$T_A$ is torque for MA; $T_B$ is torque for MB;

$T_I$ is input torque to the transmission at shaft 12, and is based upon the engine torque;

$T_O$ is output torque from the transmission at shaft 64;

$N_I\text{DOT}$ is the input speed profile of the input shaft 12 to the transmission;

$N_{O\_DOT}$ is output speed profile of the output shaft 64 of the transmission, indicative of vehicle acceleration; and, kn comprises a 2×4 matrix of parameters determined by transmission hardware gear and shaft interconnections and estimated hardware inertias applicable to the current drive range.

Figure 4:
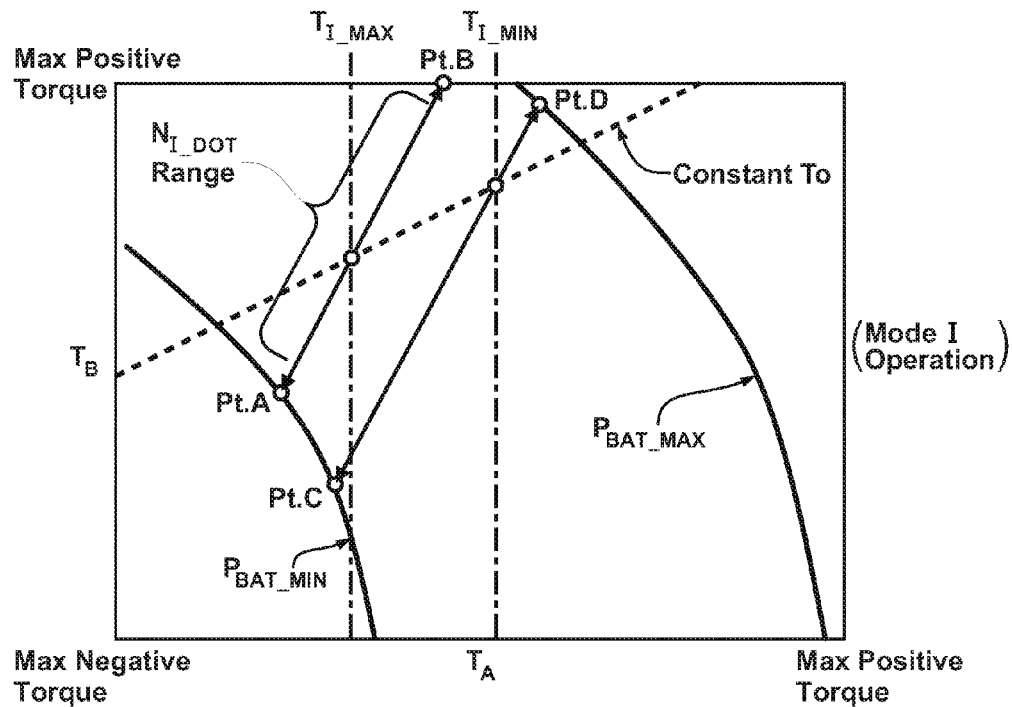

Torques $T_A$ and $T_B$ are bounded by minimum and maximum limits, $T_{A\_MAX}$, $T_{A\_MIN}$, $T_{B\_MAX}$, $T_{B\_MIN}$, as shown in FIG. 4, which comprise limits imposed by constraints on the battery. The substance of Eq. 1 is preferably converted to an algorithm resident in one of the control modules which is executed during each 6.25 msec loop cycle. The control scheme determines and implements preferred parametric control values for motor torques $T_A$, $T_B$ as described.

Referring again to FIG. 4, a graphical depiction of an operating region for the exemplary system is shown, for operating the system in the continuously variable Mode 1 operation. A first operating space is defined, by a torque output range for MA 56 ($T_{A\_MIN}$, $T_{A\_MAX}$) plotted on the x-axis and a torque output range for MB 72 ($T_{B\_MIN}$, $T_{B\_MAX}$), plotted on the y-axis. The torque output ranges are limited by a second operating space, defined based upon battery power limitations, i.e., $P_{BAT\_MIN}$ and $P_{BAT\_MAX}$. Based upon the relationship described with reference to Eqs. 1 and 2, for a given fixed or constant output torque, $T_O$, and the preferred input speed profile, $N_{I\_DOT}$, there is an allowable range of input torques, $T_{I\_MIN}$ to $T_{I\_MAX}$, which can be generated and transmitted to the engine to spin the engine to meet the input speed profile $N_{I\_DOT}$ in anticipation of stopping rotation of the engine. The input speed profile $N_{I\_DOT}$ can be determined from a predetermined controlled engine speed spindown profile, and to control engine position at engine stop, consistent with engine speed depicted in FIG. 4, to meet operator requirements and engine and powertrain constraints. The control scheme described herein can operate the electrical machines MA and MB. Thus, in the embodiment described, stopping the engine includes generating initial torque values for $T_A$ and $T_B$, based upon known and selected values for $T_I$, $T_O$, $N_{I\_DOT}$, and $N_{O\_DOT}$ using Eqs. 1 and 2. At initiation of the engine stop, the input speed profile $N_{I\_DOT}$ is determined based upon a preferred elapsed time to stop rotation of the engine, within the allowable speed profile $N_{I\_DOT}$ operating window discernible in FIG. 4. Output torque $T_O$ and output speed profile $N_{O\_DOT}$ are previously determined values, and $T_I$ comprises engine torque. The electrical machines MA and MB are controlled through the TPIM to deliver the determined torque values for $T_A$ and $T_B$, and the process is repeated for each cycle of the 6.25 msec loop cycle as the engine speed decreases according to the determined engine input speed profile $N_{I\_DOT}$. Thus the control system controls torque outputs $T_A$ and $T_B$ for MA and MB.

Torque outputs from the first and second electrical machines are subsequently controlled to spindown and stop rotation of the engine substantially near a target crank angle position. As described above, torque outputs are controlled based upon the input speed profile $N_{I\_DOT}$ to achieve engine stop at or near the target crank angle. The engine spindown comprises a calculated profile which equates to a predetermined number of degrees of rotation, e.g., 1000 degrees, by which the engine stops rotating. Engine spindown is calculated starting at an engine angle value, and the engine speed is closed-loop controlled to reach a final target engine angle target.

The previously closed engine throttle can be re-opened subsequent to stopping rotation of the engine. Electronically-controlled intake air management valves typically have a 'park' position that is greater than zero throttle position in order to permit engine operation in the event of a system fault. Thus the intake air management valve is actively controlled to reach the zero throttle position, and comprises an electrical load. Allowing the park position reduces electrical load.

The damper clutch is preferably controlled to lock rotation of the engine to the electro-mechanical transmission during periods when the engine is stopped. Co-pending U.S. patent application Ser. No. 11/743,945 entitled METHOD AND APPARATUS TO DETERMINE ROTATIONAL POSITION OF AN INTERNAL COMBUSTION ENGINE, provides additional details related to using the resolvers to determine engine position, the contents of which are hereby incorporated by reference. The position information from the resolvers provides an absolute measurement of engine position and has higher measurement resolution than the crank position sensor. The resolvers are operative to provide an accurate measure of shaft angle immediately upon application of electrical power and continuously during ongoing operation, effecting improved control and accuracy.

The action of locking the damper clutch C5 to lockout the damper 20 during the engine stop enables the control system to cancel oscillations occurring at critical system frequencies by actively controlling torque outputs from the electrical motors. Critical frequencies at which there is typically resonance include vehicle rocking occurring at about 2 Hz (30 rpm) driveline resonance occurring at about 4 Hz (60 rpm), powertrain mount resonance at about 14 Hz (200 rpm), and damper resonance in a range of 9-12 Hz (125 rpm).

Engine crank torque referred to as $T_I$(crank) comprises a measure of engine crankshaft torque when the engine is unfired. The engine crank torque comprises a sum of the cylinder torques calculated for each cylinder, and is preferably determined by executing a simulation model in the control system. The simulation model calculates, in real-time, a cylinder pressure for each cylinder as a function of the engine crank angle. The cylinder pressure is based upon compression pulses generated by the action of crankshaft rotation wherein movement of each piston in each engine cylinder is resisted by air trapped within the combustion chamber of the cylinder, the resistance determined by positions of intake and exhaust valves of the engine. Each cylinder torque is determined by multiplying a torque ratio by the cylinder pressure. The torque ratio is determined for each cylinder as a function of crank angle, which encompasses changes in cylinder geometry and cylinder friction. The torque ratio is preferably a pre-calibrated array of values stored in memory, and retrievable as based upon crank angle. An exemplary method to determine the engine crank torque using a simulation model is described in co-pending U.S. patent application Ser. No. 11/669,522, entitled METHOD AND APPARATUS TO DETERMINE PRESSURE IN AN UNFIRED COMBUSTION CHAMBER, which is incorporated by reference herein. The exemplary simulation model is preferably executed in one of the control modules, and determines a parametric value for the engine crank torque $T_I$(crank) during each 6.25 msec loop. The exemplary simulation model adapts to changing operating and ambient conditions, and determines parametric values for the engine crank torque when the engine is unfired.

Specific alternate embodiments include hybrid systems employing a single electrical machine that is selectively operatively connected to the engine to control crank rotation, including e.g., a belt-alternator-starter powertrain, and, an electro-mechanical transmission system employing a single electrical machine for torque and electrical energy generation. Another alternate embodiment comprises use of a compression-ignition engine, wherein the engine starting sequence uses fuel delivery timing and quantity to effect the starting and torque output from the engine, which is known to a skilled practitioner.

It is understood that modifications are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to control operation of a hybrid powertrain to stop an internal combustion engine the powertrain comprising the internal combustion engine and first and second electrical machines and an electro-mechanical transmission selectively operative to transmit torque therebetween, the method comprising the following steps in the sequence set forth:
first, controlling engine operation to stop firing the engine and minimize intake manifold absolute pressure; then,
controlling a damper clutch to lock rotation of the engine and the electro-mechanical transmission; then,
selectively controlling torque outputs from the first and second electrical machines to reduce engine speed; and then,
selectively controlling torque outputs from the first and second electrical machines to stop rotation of the engine substantially near a predetermined crank position.

2. The method of claim 1, wherein the torque output from the first and second electrical machines is limited based upon electrical energy capacity of an electrical energy storage device operative to supply electrical energy thereto.

3. The method of claim 1, comprising selectively controlling the electro-mechanical transmission to one of a first and a second continuously variable mode of operation prior to controlling the engine operation to stop firing the engine.

4. Method to control operation of a hybrid powertrain to stop an internal combustion engine the powertrain comprising the internal combustion engine and an electrical machine and an electro-mechanical transmission selectively operative to transmit torque therebetween, the program comprising the following steps in the sequence set forth:
first, selectively controlling the electro-mechanical transmission to a continuously variable mode of operation; then,
controlling engine operation to stop firing the engine and minimize intake manifold absolute pressure; then,
controlling a damper clutch to lock rotation of the engine and the electro-mechanical transmission; then,
selectively controlling torque output from the electrical machine to reduce engine speed; and then,
selectively controlling torque output from the electrical machine to stop rotation of the engine substantially near a predetermined crank position.

5. Article of manufacture, comprising a storage medium having machine-executable code encoded therein for controlling operation of a powertrain to stop an internal combustion engine during ongoing vehicle operation the powertrain comprising the internal combustion engine and first and second electrical machines and an electro-mechanical transmission selectively operative to transmit torque therebetween, the program comprising the following steps in the sequence set forth:
first, code to control engine operation to stop firing the engine; then,
code to control a damper clutch to lock rotation of the engine and the electro-mechanical transmission; then,
code to selectively control torque outputs from the first and second electrical machines to reduce engine speed; then,
code to selectively control torque outputs from the first and second electrical machines to stop rotation of the engine substantially near a predetermined crank position.

6. The article of claim 5, wherein the code to control engine operation to stop firing the engine further comprises code to minimize intake manifold absolute pressure.

7. The article of claim 6, further comprising code to open an engine throttle subsequent to stopping rotation of the engine.

8. The article of claim 5, further comprising code to control the damper clutch to lock rotation of the engine to the electro-mechanical transmission during a period when the engine is stopped.

9. The article of claim 5, wherein the code to control engine operation to stop firing the engine comprises code to sequentially disable fuel injection into the engine.

10. The article of claim 9, further comprising code to control spark ignition to minimize engine torque prior to sequentially disabling the fuel injection when the engine comprises a spark-ignition engine.

11. The article of claim 9, further comprising code to control fuel injection timing to minimize engine torque when the engine comprises a compression-ignition engine.

12. The article of claim 9, further comprising code to selectively control a variable cam phasing device to a parked position.

13. The article of claim 12, further comprising the variable cam phasing device controlled to a full-retard position.

14. The article of claim 12, further comprising the variable cam phasing device controlled to a full-advance position.

15. The article of claim 5, wherein the code to minimize intake manifold absolute pressure comprises code to substantially completely close intake air management valves of the engine.

16. The article of claim 5, wherein the code to minimize intake manifold absolute pressure comprises code to control an engine throttle to a substantially closed position.

17. The article of claim 5, wherein the code to control the damper clutch to lock rotation of the engine and the electro-mechanical transmission further comprises code to substantially immediately lock rotation of the engine and the electro-mechanical transmission.

18. The article of claim 5, wherein the code to selectively control torque outputs from the first and second electrical machines to reduce engine speed comprises executable code comprising a system equation to determine motor torque outputs from each of the first and second electrical machines based upon an input torque from the engine and an operator torque request.

19. The article of claim 5, comprising code to selectively control the electro-mechanical transmission to one of a first and a second continuously variable mode of operation prior to executing the code to control engine operation to stop firing the engine.

* * * * *